Solubility of m-dicarbinol in mixtures of m-diisopropylbenzene and m-monocarbinol
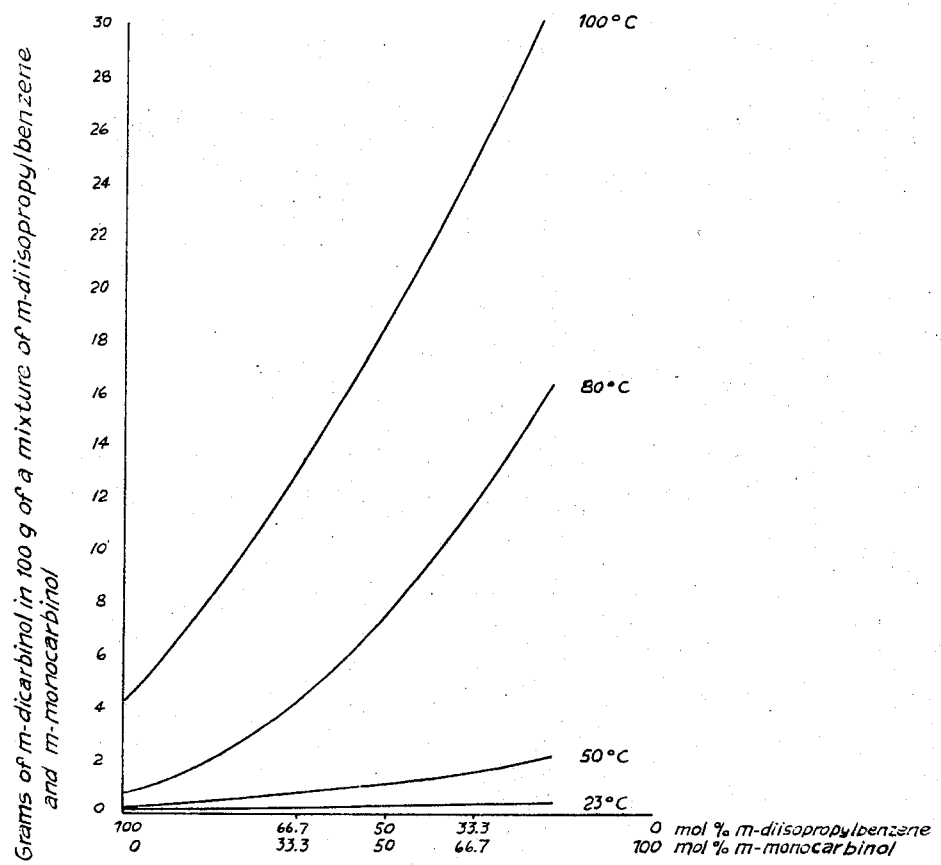
INVENTOR.
VOLKERT FALTINGS
JOSEF EWERS
BY Burgess, Dinklage & Sprung
ATTORNEYS United States Patent Office 3,420,893
Patented Jan. 7, 1969

3,420,893
PROCESS FOR THE RECOVERY OF
ARALIPHATIC DICARBINOLS
Volkert Faltings, Gelsenkirchen-Buer, and Josef Ewers, Dorsten, Westphalia, Germany, assignors to Scholven-Chemie Aktiengesellschaft, Gelsenkirchen-Buer, Germany
Filed Apr. 23, 1964, Ser. No. 362,036
Claims priority, application Germany, May 4, 1963, Sch 33,235
U.S. Cl. 260—618         7 Claims
Int. Cl. C07c 29/00; C07c 31/18

ABSTRACT OF THE DISCLOSURE

The production of araliphatic dicarbinols of the formula:

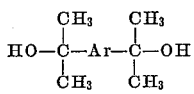

in which Ar is aryl is disclosed by successively oxidizing, reducing and cooling an aromatic hydrocarbon wherein a further quantity of the starting aromatic hydrocarbon is introduced into the reduction mixture to promote crystallization.

---

This invention relates to the production of araliphatic dicarbinols and more particularly relates to an improved process for the production of araliphatic dicarbinols by oxidation of a hydrocarbon to form a hydroperoxide followed by reduction of the hydroperoxide to form the dicarbinol.

The oxidation of dialkylated aromatic hydrocarbons as, for example, m- or p-diisopropylbenzene with oxygen or gas-containing oxygen, as heretofore practised, results in the main in the production of the corresponding mono- and di-hydroperoxide. According to the prior art, the di-hydroperoxide is recovered by extracting the oxidation reaction mixture with dilute aqueous alkali solution and thereafter extracting the aqueous extract with an organic solvent until the dihydroperoxide is obtained in a pure form. It is then possible to produce the corresponding dicarbinol from the hydroperoxide by reduction. However, for practical purposes, such a process is out of the question because of the considerable difficulty involved in obtaining the pure dihydroperoxide in an industrially satisfactory manner.

Another proposal for producing araliphatic dicarbinols consists in starting with the hydroxyhydroperoxide and reducing that compound to the corresponding dicarbinol. The hydroxyhydroperoxide starting material is produced in considerable quantities as a by-product in the oxidation of the hydrocarbon. However, it also can only be separated from the other hydrocarbon oxidation products by difficult and expensive extraction procedures, as a result of which this method is similarly not practical for industrial applications. It has also been suggested to produce the dicarbinols using, as starting material, a hydroxyhydroperoxide prepared directly for this purpose. It is known, for example, to prepare hydroxyhydroperoxide as the main reaction product by carrying out the oxidation of the hydrocarbon in such a manner that mainly monohydroperoxide and relatively small amounts of di-hydroperoxide are produced. This oxidation mixture is then extracted with dilute aqueous alkali solution, the monohydroxyhydroperoxide and the dihydroperoxide present being obtained in the form of their corresponding dissolved alkali metal salts. The free hydroxyhydroperoxide is then liberated from this solution by treatment thereof with a carboxylic acid. The remainder of the oxidation mixture, which still contains monohydroperoxide and monocarbinol in addition to unconverted hydrocarbon, is reduced and the monocarbinol solution thereby obtained returned to the oxidation. This process is, accordingly, also encumbered by an extraction stage, the same being inadequate to produce the desired product in a pure form. In any event, this process is also not practical for industrial use because of the complicated and numerous steps required. Thus, it has not been possible up until the present to avoid the problems in the industrial production of dicarbinols by resorting to the technique of producing the hydroxyhydroperoxide first.

Thus, an object of this invention is the provision of an efficient and economical process for the production of araliphatic carbinols.

Another object of this invention is to provide a process which is adapted to be employed in the preparation of araliphatic carbinols, which process avoids the disadvantages of the prior art, particularly as it concerns the production of a substantially pure, easily recoverable reaction product.

Various other objects and advantages will be apparent as the nature of the invention is more fully disclosed.

In accordance with the invention, it has now been found that dicarbinols of the formula

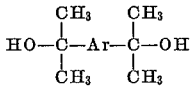

wherein Ar represents an aromatic radical or an alkyl substituted aromatic radical, can be easily and simply obtained by oxidizing an aromatic hydrocarbon with oxygen or a gas-containing oxygen in an oxidation zone and thereafter at least partially introducing the oxidation mixture thus obtained into a reduction zone and there effecting the reduction of the hydroperoxides contained in the oxidation mixture to the corresponding carbinols. The dicarbinols that are formed in the reduction are then crystallized out at low temperatures and the reduction mixture following separation of the crystallized dicarbinols recycled back to the oxidation zone.

Aromatic hydrocarbons which can be reacted in this way are of the formula

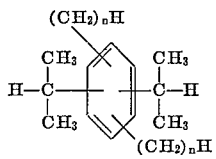

wherein each n is 0, 1 or 2, for example m-diisopropylbenzene, p-diisopropylbenzene, 1-methyl-2,4-diisopropylbenzene, 1-methyl-2,5-diisopropylbenzene, 1,4-dimethyl-2,5-diisopropylbenzene, 1-ethyl-2,4-diisopropylbenzene, 1-ethyl-2,5-diisopropylbenzene and the like.

The process of the invention is thus based on the finding that the dicarbinol which is formed in the reduction can be removed continuously or at periodic intervals by simple crystallization, as a result of which the dicarbinol produced in the reaction is obtained in a very pure form.

This finding is most surprising in that the reduction mixture contains, in addition to the dicarbinol, considerable amounts of the corresponding monocarbinol. It was to have been expected that the monocarbinol compound would act as a solubilizer, making crystallization of the dicarbinol impossible. Contrary to what should have been expected, it has been found, in accordance with the invention, that the dicarbinols—both the p-dicarbinol and the m-dicarbinol—can be very easily and readily crystallized out of the reduction mixture by chilling. The process thus has the additional advantage that it can be applied equally successfully to a mixture containing both the m- and p-compounds.

The oxidation of the starting hydrocarbon takes place under the conventional reaction conditions. The oxidation is effected with oxygen or a gas which contains oxygen at a temperature within the range of about 50 to 135° C., preferably in the presence of an alkaline compound (as described in the German patent specification 926,426, page 2, lines 68–78), the latter serving to neutralize the acid materials formed during reaction.

An important advantage of the process of the invention consists in that the oxidation can easily be conducted to higher concentrations ranging, for example, from 20 to 80% hydroperoxide (calculated as monohydroperoxide). The by-products which are formed with these higher concentrations and which normally have a deleterious effect on the reaction consist, in the main, of carbinols (monocarbinol and hydroxyhydroperoxide) and their presence, rather than being deleterious, is desirable in the process in accordance with the invention. Despite their presence, it is possible to produce by the instant process a substantially pure dicarbinol.

However, it is also possible and particularly if the process is to be carried out continuously, to conduct the oxidation at a relatively low concentration of hydroperoxide.

The oxidation mixture is passed from the oxidation zone into a reduction zone where the hydroperoxides are reduced to the corresponding carbinols. The reduction of the hydroperoxides is carried out in the conventional manner, as by treatment with a reducing agent, for example, alkali sulfites and preferably sodium sulfite, alternatively by hydrogenation in the presence of an usual hydrogenation catalyst such as platinum and the like.

Thus, for example, if as starting material for the process, m-diisopropylbenzene is employed as hydrocarbon, there is produced in the oxidation a mixture which contains, in addition to the m-diisopropylbenzenemonohydroperoxide, the corresponding dihydroperoxide and hydroxyhydroperoxide, as well as unreacted hydrocarbon. Reduction of the aforesaid mixture results in the production of m-diisopropylbenzene dicarbinol (from the di-hydroperoxide and the hydroxyhydroperoxide) and monocarbinol (from monohydroperoxide).

If reducing agents, e.g., sodium sulfite, are employed the reduction temperatures are in the range of about 80 to 200° C. and the pressures in the range of about 1 to 100 atmospheres, the pressures autogenously built up corresponding to the reduction temperatures being preferred.

If hydrogenation catalysts are employed the reduction temperatures are in the range of about 50 to 120° C., preferably 60 to 90° C., the pressures ranging from 1 to 100 atmospheres. In this range the reaction temperatures are such that an hydrogenation of the aromatic nucleus of the peroxy compound to be reacted is prevented. As hydrogenation catalyst all the usual catalysts known for this purpose can be used, i.e., the metals of Group VIII of the Periodic System. Preferred catalysts are nickel, cobalt, iron, platinum, palladium. Metals of Group I of the Periodic System, such as copper, silver, gold are also possible catalysts, preferably in mixture with the said metals of Group VIII of the Periodic System. For example a catalyst containing nickel and also copper and silver shows good results. The catalyst may be used in form of the pure metals or in form of catalyst carriers containing the metals. As catalyst carriers all the usual materials known for this purpose can be used, such as alumina gel, silica gel, kieselguhr, montmorillonite, bentonite, diatomaceous earth and the like, the metals being used in quantities of 0.01 to 30% by weight of the carrier material. A preferred catalyst is platinum on a $Al_2O_3$ carrier.

The desired dicarbinol is separated from this mixture by subjecting the same to chilling. Fir this purpose the reduction mixture is passed into a chilling zone. Preferably there is also introduced into the chilling zone the hydrocarbon employed as starting material in the process as the increase in the hydrocarbon concentration acts to reduce the solubility of the dicarbinol. The temperature in the chilling zone in general ranges from about 20 to 100° C. In this range the temperature is so chosen that it ranges at least about 10° C. under the temperature of the reduction zone.

The dicarbinol is obtained from the reduction in the form of its mixture with monocarbinol and hydrocarbon, from which is can very easily and readily be separated in crystalline form, as shown in the accompanying drawing, which sets forth a graph depicting the relationship between the solubility of dicarbinol in mixtures of hydrocarbon and monocarbinol at various temperatures. As shown by the graph, in 100 grams of a mixture of 33.3 mol percent m-DIPB and 66.7 mol percent monocarbinol as obtained in the oxidation and reduction of m-diisopropylbenzene, 25.2 grams of m-dicarbinol will be in solution at 100° C., 11.8 grams at 80° C., 1.5 grams at 50° C., and 0.25 gram at 23° C.

The preferred method for effecting the process of the invention is to select reaction conditions whereby no dicarbinol is precipitated out in the reduction zone. If, for example, the above reduction mixture of 33.3 mol percent of m-DIPB and 66.7 mol percent of monocarbinol is obtained following the reduction and introduction of additional quantities of m-DIPB, the oxidation mixture which is fed into the reduction zone may have a hydroperoxide content of 44% (calculated as monohydroperoxide) without any precipitation of dicarbinol taking place in the reduction zone provided that the reduction zone is maintained at a temperature of 100° C. If a temperature of 80° C. is maintained in the reduction zone, no dicarbinol will be precipitated out under the same conditions provided that the oxidation mixture introduced into the reduction zone has a content of 22% peroxide (as monohydroperoxide).

It is possible, of course, to employ different oxidation percentages in the process. However, the use of lower oxidation percentages has the disadvantage that an increased turn-over takes place per unit of weight of dicarbinol produced requiring the expenditure of greater chilling and heating energies. Nevertheless, this method of effecting the process may be advantageous if it is necessary to substantially reduce the decomposition of hydroperoxides to acids and ketones which take place to a slight extent in the oxidation zone.

Preferably, further quantities of fresh hydrocarbon are introduced, as noted above, into the chilling and crystallization zone. This fresh hydrocarbon, following its use in the chilling and crystallization zone, can be advantageously employed for washing the dicarbinol crystalline product or, alternatively, it is possible to feed this hydrocarbon back into the reduction zone or to recycle it to the oxidation zone following separation of the dicarbinol crystals therefrom.

It has been found to be advantageous to introduce a small portion of the oxidation mixture produced in the oxidation zone back into the reactor, where the oxidation takes place, to assure smooth oxidation even in the bottom-most portions of the reactor. The remaining oxidation mixture is, of course, introduced into the reduction zone. The diversion of a portion of the oxidation mixture back into the oxidation zone has proved particularly advantageous where no agitator is used in the oxidation zone and where the feed recycled from the cooling and crystallization zone to the oxidation zone does not contain any hydroperoxides.

The following examples illustrate in greater particularity the method of preparing the araliphatic dicarbinols. It will be understood that these examples are given for purpose of illustrating preferred processes and are to be construed as limiting the invention to the processes described therein.

Abbreviations used in the following examples:

DIPB = diisopropylbenzene
MHP = monohydroperoxide
DHP = dihydroperoxide
HHP = hydroxyhydroperoxide
MC = monocarbinol
DC = dicarbinol

EXAMPLE 1

Air or oxygen was passed into a mixture of 270 parts by weight m-diisopropylbenzene (m-DIPB), 594 parts m-isopropylphenyl-dimethylcarbinol (m-MC), and 13 parts m-di-(2-hydroxy-2-propyl)-benezene (m-DC), at 100° C., and in the presence of a small amount of aqueous sodium bicarbonate solution, with agitation, until the hydroperoxide content amounted to 43.5%, calculated as m-DIPB-monohydroperoxide (m-MHP). The oxidation product obtained was then run into a solution of 270 parts by weight $Na_2SO_3$ in 810 parts of water with agitation over a period of 4 hours at 100° C. Thereafter, the mixture was stirred for another 12 hours at the same temperature. 171.5 parts m-DIPB were then added to the separated organic phase and the mixture cooled to 50° C. The m-DC which precipitated out in solid form was separated and washed, first with m-DIPB and then with petroleum ether. After drying, 410 parts of a product having a melting point of 125–134° C. were obtained. 390 parts m-DC (having by recrystallization from benzene) a melting point of 135–136° C. were obtained

EXAMPLE 2

Air or oxygen was introduced with agitation at a temperature of 80° C. into a mixture of 266 parts by weight m-DIPB, 589 parts by weight m-MC, 4 parts by weight m-MHP, 4.3 parts by weight m-(2-hydroperoxy-2-propyl) phenyl-dimethylcarbinol (m-HHP) and 2.2 parts by weight m-DC, until the hydroperoxide content has reached 18.7% (calculated as m-MHP). Following the addition of 66.3 parts by weight fresh m-DIPB, the oxidation product at the same temperature (80° C.) was introduced into and passed through a column packed with a catalyst of 0.3% B.W. platinum on $Al_2O_3$, an excess of $H_2$ being fed and passed through the column into a counterflow relationship. At a rate of flow of 1 liter per hour of oxidation product and at half a liter of catalyst volume, a reduced product was obtained, which still had a hydroperoxide content of about 0.9% (calculated as m-MHP). After chilling separating of the crystalline product and recrystallization from benzene, 77 parts, by weight, having a melting point of 135° C. m-DC were obtained.

EXAMPLE 3

A liquid containing 3,000 mol/h. p-DIPB, 5,005 mol/h. p-MC and 80 mol/h. p-DC is introduced in a reaction vessel, after having been passed through a saturated aqueous solution of sodium bicarbonate. 184 normal m.³ of air/h. are bubbled through the liquid. The temperature is 85° C. In this way a hydroperoxide content of 13.6% by weight (calculated as MHP) in the vessel is maintained. The oxidation product of 2,500 mol/h. p-DIPB, 455 mol/h. p-MHP, 45 mol/h. p-DHP, 455 mol/h. p-HHP and 4,630 mol/h. p-DC is introduced in the reduction zone. The hydrogenation catalyst is 0.35% by weight platinum on highly purified $Al_2O_3$ ("Sinclair-Baker catalyst"). The catalyst has the form of little cylinders (diameter: 0.16 centimeter, length: 0.16–0.83 centimeter). The catalyst parts are situated in a vessel of cylindrical form. In the upper part of this reduction zone the oxidation product is passed with a speed of 1 l./h. per liter of the reaction space. In the lower part hydrogen is introduced in such quantities that 1/10 of the quantity added can be drawn off at the top of the reduction vessel. This quantity is recycled after addition of fresh hydrogen. The reduction temperature is 80–85° C. The reaction product is continuously drawn off in the lower part of the reaction vessel under the entrance of the hydrogen. This product which contains 2,500 mol/h. p-DIPB, 5,005 mol/h. p-MC and 580 mol/h. p-DC is cooled (50° C.) and centrifuged. The liquid obtained has 2,477 mol/h. p-DIPB, 4,950 mol/h. p-MC and 80 mol/h. p-DC. The solid substance obtained has 23 mol/h. p-DIPB, 55 mol/h. p-MC and 500 mol/h. p-DC. This substance is molten and introduced in the middle-part of a column of bottoms. In the sump of this column a temperature of 145–150° C., and in the system a vacuum of 20 torr is maintained. At the sump of the column 500 mol/h. p-DC are drawn off. At the top of the column 23 mol/h. p-DIPB and 55 mol/h. p-MC are drawn off and added to the liquid obtained after centrifuging. This total liquid contains 2,500 mol p-DIPB, 5,005 mol p-MC and 80 mol p-DC. After addition of 500 fresh p-DIPB the liquid is passed through the sodium carbonate solution and then introduced in the oxidation zone.

EXAMPLE 4

A liquid containing 3,728 mol/h. m-DIPB, 5,328 mol/h. m-MC and 57 mol/h. m-DC is introduced in a reaction vessel equipped with a stirrer. Before introduction the liquid is passed through a saturated aqueous solution of sodium bicarbonate. 392 normal m.³/h. are bubbled through the liquid. The oxidation temperature is 85° C. The mixture contains 24% by weight hydroperoxide (calculated as MHP), 2,664 mol/h. m-DIPB, 888 mol/h. m-MHP, 176 mol/h. m-DHP, 888 mol/h. m-HHP, 4,440 mol/h. m-MC and 57 mol/h. m-DC are drawn off and introduced in the reduction zone, the reduction being carried out in the same manner as described in Example 3. After reduction 2,664 mol/h. m-DIPB, 5,328 mol/h. m-MC and 1,121 mol/h. m-DC are obtained. After cooling (40° C.) the product is centrifuged. The liquid obtained has 2,615 mol/h. m-DIPB, 5,210 mol/h. m-MC and 57 mol/h. m-DC. The solid substance obtained has 49 mol/h. m-DIPB, 118 mol/h. m-MC and 1,064 mol/h. m-DC. This product is molten and distilled as described in Example 3, the vacuum being 30 torr. At the sump of the column 1,064 mol/h. m-DC are drawn off with a melting-point of 134–136° C. At the top of the column 49 mol/h. m-DIPB and 118 mol/h. m-MC are drawn off. This product is added to the liquid obtained after centrifuging and then after addition of 1,064 mol/h. fresh m-DIPB recycled to the sodium bicarbonate solution and thereafter to the oxidation.

We claim:

1. A method for the recovery of araliphatic dicarbinols from a mixture obtained by the oxidation of an aromatic hydrocarbon of the formula:

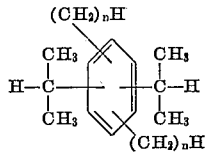

wherein each $n$ is 0, 1 or 2, with an oxygen containing gas at a temperature of from 50° to 135° C. followed by reduction of the oxidation mixture with sodium sulfite at a temperature of from 80° to 200° C. and a pressure of 1–100 atm., which comprises introducing into said mixture a quantity of said aromatic hydrocarbon and thereafter cooling to separate the dicarbinol.

2. A method for the recovery of araliphatic dicarbinols from a mixture obtained by the oxidation of an aromatic hydrocarbon of the formula:

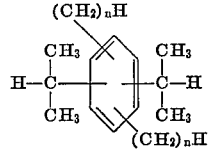

wherein each n is 0, 1 or 2, with an oxygen containing gas at a temperature of from 50° to 135° C. followed by reduction of the oxidation mixture with hydrogen and a hydrogenation catalyst at a pressure of 1–100 atm., which comprises introducing into said mixture a quantity of said aromatic hydrocarbon and thereafter cooling to separate the dicarbinol.

3. A method for the recovery of m-diisopropyl benzene dicarbinol from a mixture obtained by the oxidation of m-diisopropyl benzene with an oxygen containing gas at a temperature of 100° C. in the presence of aqueous bicarbonate solution to a conversion of about 18.7% hydroperoxide calculated as m-diisopropyl benzene monohydroperoxide followed by reduction of the oxidation mixture with hydrogen and Pt/Al$_2$O$_3$ catalyst, which comprises introducing into said mixture a quantity of m-diisopropyl benzene and thereafter cooling to separate the dicarbinol.

4. A method according to claim 1 in which said aromatic hydrocarbon is oxidized to a conversion of from about 20 to 80% hydroperoxide, calculated as monohydroperoxide.

5. A method according to claim 1 in which the oxidation is in the presence of an acid binding agent.

6. A method according to claim 1 in which a portion of the oxidation mixture is reintroduced into the oxidation reaction.

7. A method according to claim 1 in which the aromatic hydrocarbon is m-diisopropyl benzene.

References Cited

UNITED STATES PATENTS

| | | |
|---|---|---|
| 2,438,125 | 3/1948 | Larond et al. |
| 2,491,926 | 12/1949 | Larond et al. |
| 2,548,435 | 4/1951 | Larond et al. |
| 2,854,487 | 9/1958 | Ovin. |
| 3,227,765 | 1/1966 | Lokey. |
| 3,278,608 | 10/1966 | Clement. |

FOREIGN PATENTS

| | | |
|---|---|---|
| 815,857 | 7/1959 | Great Britain. |

LEON ZITVER, *Primary Examiner.*

T. G. DILLAHUNTY, *Assistant Examiner.*